United States Patent
Boca et al.

(10) Patent No.: US 10,682,764 B2
(45) Date of Patent: Jun. 16, 2020

(54) 3D SEGMENTATION FOR ROBOTIC APPLICATIONS

(71) Applicant: ABB Schweiz AG, Baden (CH)

(72) Inventors: Remus Boca, Simsbury, CT (US); Thomas A. Fuhlbrigge, Ellington, CT (US)

(73) Assignee: ABB Schweiz AG, Baden (CH)

( * ) Notice: Subject to any disclaimer, the term of this patent is extended or adjusted under 35 U.S.C. 154(b) by 142 days.

(21) Appl. No.: 15/663,783

(22) Filed: Jul. 30, 2017

(65) Prior Publication Data

US 2018/0056515 A1 Mar. 1, 2018

Related U.S. Application Data (63) Continuation of application No. PCT/IB2016/000141, filed on Jan. 29, 2016.
(Continued)

(51) Int. Cl.
*G06T 7/11* (2017.01)
*B25J 9/16* (2006.01)
*G06T 7/194* (2017.01)

(52) U.S. Cl.
CPC .............. *B25J 9/1697* (2013.01); *G06T 7/11* (2017.01); *G06T 7/194* (2017.01);
(Continued)

(58) Field of Classification Search
CPC ...... B25J 9/1697; B25J 9/1692; B25J 9/1679; Y10S 901/46; Y10S 901/02;
(Continued)

(56) References Cited

U.S. PATENT DOCUMENTS

2009/0033655 A1 2/2009 Boca et al.
2011/0280472 A1* 11/2011 Wallack ............... B25J 9/1692
382/153
(Continued)

FOREIGN PATENT DOCUMENTS

JP 2001052183 A 2/2001

OTHER PUBLICATIONS

International Preliminary Report on Patentability, PCT/IB2016/000141, ABB Schweiz AG, dated Aug. 10, 2017, 13 pages.
(Continued)

*Primary Examiner* — Dalena Tran
(74) *Attorney, Agent, or Firm* — J. Bruce Schelkopf; Taft Stettinius & Hollister LLP (57) ABSTRACT

A robotic system includes a robot having an associated workspace; a vision sensor constructed to obtain a 3D image of a robot scene including a workpiece located in the workspace; and a control system communicatively coupled to the vision sensor and to the robot. The control system is configured to execute program instructions to filter the image by segmenting the image into a first image portion containing substantially only a region of interest within the robot scene, and a second image portion containing the balance of the robot scene outside the region of interest; and by storing image data associated with the first image portion. The control system is operative to control movement of the robot to perform work, on the workpiece based on the image data associated with the first image portion.

19 Claims, 10 Drawing Sheets

Related U.S. Application Data (60) Provisional application No. 62/109,337, filed on Jan. 29, 2015.

(52) U.S. Cl.
CPC ............ *G05B 2219/37555* (2013.01); *G05B 2219/40004* (2013.01); *G06T 2207/20104* (2013.01); *G06T 2207/20121* (2013.01); *G06T 2207/20168* (2013.01)

(58) Field of Classification Search
CPC ......... Y10S 901/47; G06T 2207/20104; G06T 2207/30164; G06T 7/11; G06T 7/74; H04N 5/23296; H04N 2005/2255; G05B 2219/37555; G05B 2219/37009; G05B 2219/39024; G05B 2219/40323; G05B 2219/40053
USPC ............... 700/245, 259, 258; 701/519, 532; 318/568.11, 561; 382/103, 153
See application file for complete search history.

(56) References Cited

U.S. PATENT DOCUMENTS

| | | |
|---|---|---|
| 2013/0006423 A1 | 1/2013 | Ito et al. |
| 2014/0039679 A1 | 2/2014 | Ando |
| 2014/0067317 A1* | 3/2014 | Kobayashi ............ B25J 9/1697 702/153 |
| 2014/0365010 A1 | 12/2014 | Yasuda et al. |
| 2015/0036876 A1* | 2/2015 | Marrion ............... G06K 9/2054 382/103 |

OTHER PUBLICATIONS

International Search Report and Written Opinion, PCT/IB2016/000141, ABB Technology AG, dated Jul. 19, 2016, 15 pages.
The Patent Office of the P. R. Of China, First Office Action in corresponding application No. 201680020143.6, dated Mar. 4, 2020, 7 pp.
The Patent Office of the P. R. Of China, Search Report in corresponding application No. 201680020143.6, dated Feb. 25, 2020, 3 pp.

\* cited by examiner

3D SEGMENTATION FOR ROBOTIC APPLICATIONS

FIELD OF THE INVENTION

This invention relates to industrial robots, and more particularly the use of 3D vision and 3D data for robotic applications.

BACKGROUND

Vision systems for robotic applications process image data that relates to handling a workpiece or performing a process, such as a manufacturing process, on a workpiece. Some existing systems have various shortcomings, drawbacks and disadvantages relative to certain applications. For example, in some systems, the visual image data set for an image of a robot scene may be larger than otherwise necessary, which may necessitate the use of a more costly larger memory and/or faster processor than may otherwise be required, or may reduce the speed at which robotic operations may be performed. Accordingly, there remains a need for further contributions in this area of technology.

SUMMARY OF THE INVENTION

Embodiments of the present invention include a robotic system. The robotic system includes a robot having an associated workspace; a vision sensor constructed to obtain a 3D image of a robot scene including a workpiece located in the workspace; and a control system communicatively coupled to the vision sensor and to the robot. The control system is configured to execute program instructions to filter the image by segmenting the image into a first image portion containing substantially only a region of interest within the robot scene, and a second image portion containing the balance of the robot scene outside the region of interest; and by storing image data associated with the first image portion. The control system is operative to control movement of the robot to perform work on the workpiece based on the image data associated with the first image portion.

DESCRIPTION OF THE DRAWING

The description herein makes reference to the accompanying drawings wherein like reference numerals refer to like parts throughout the several views, and wherein.

DETAILED DESCRIPTION

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Figure 1:
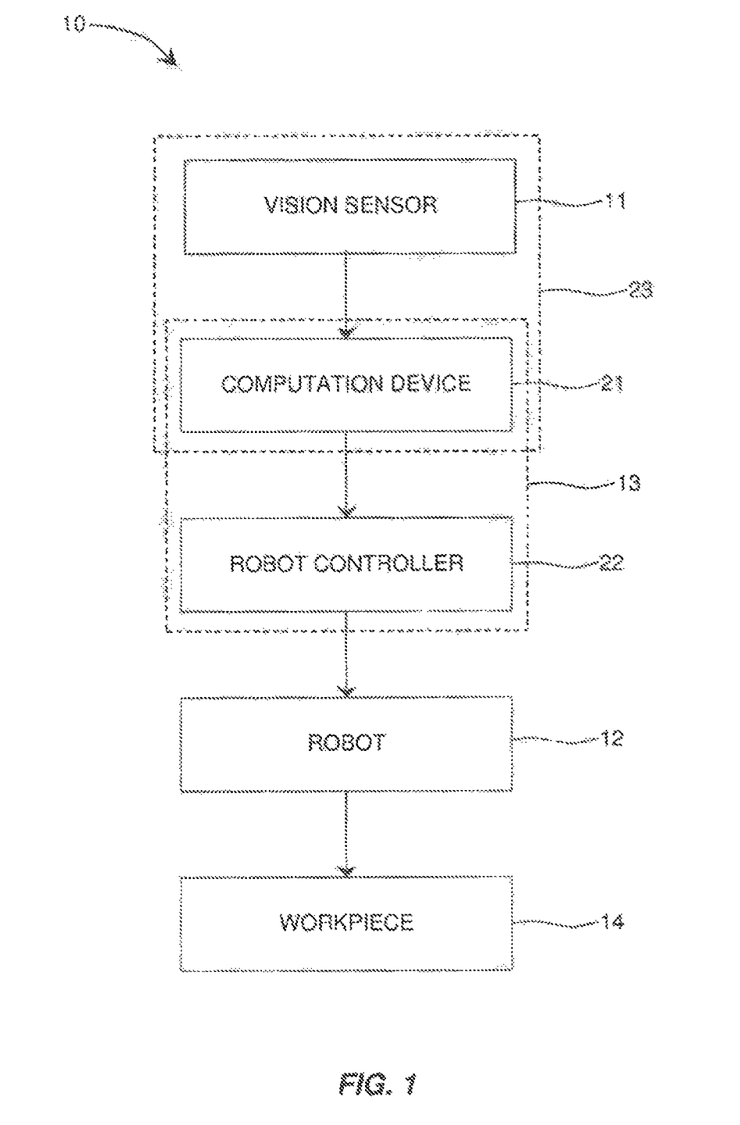
FIG. 1 schematically illustrates some aspect of a nonlimiting example of a robotic system that has a robot and a vision sensor which provides an image of a workpiece in accordance with an embodiment of the present invention.
Figure 2:
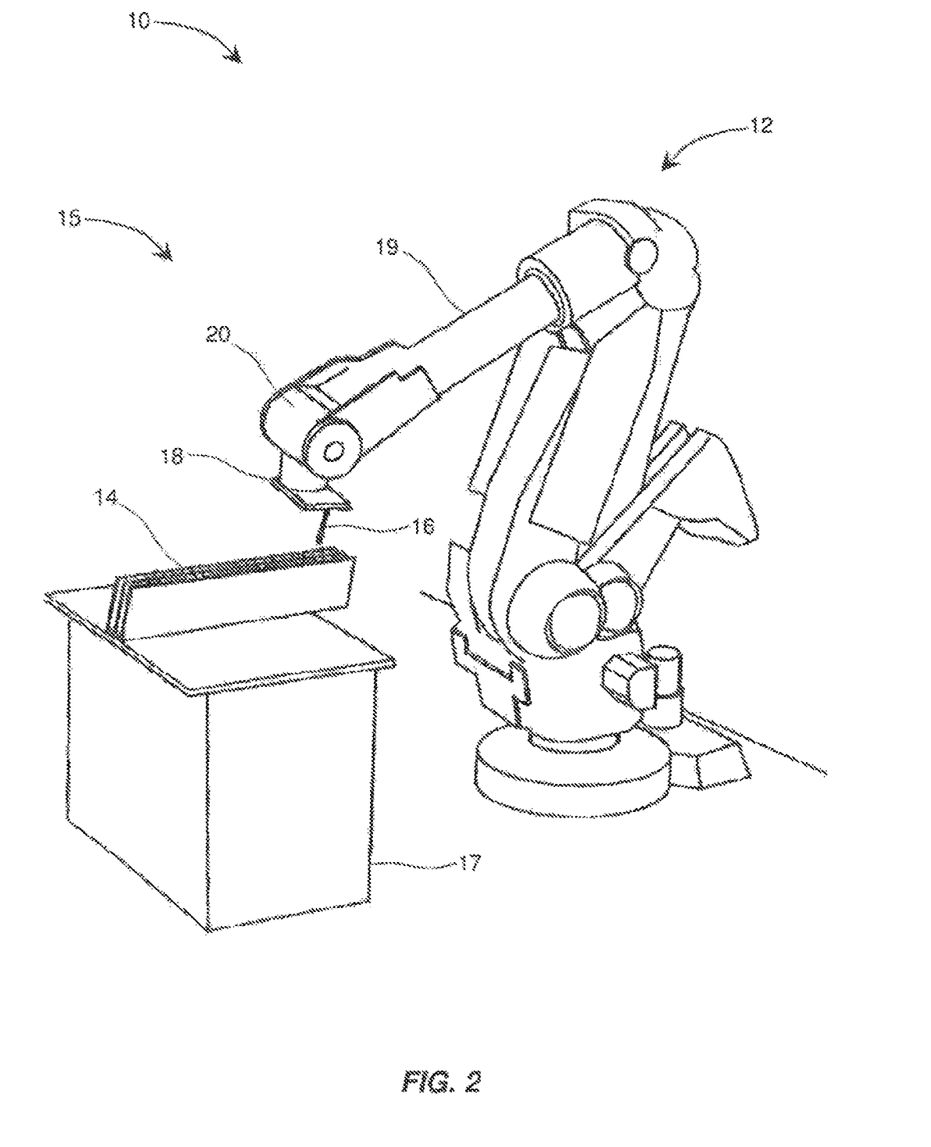
FIG. 2 schematically illustrates some aspects of a nonlimiting example of a robotic system n a vision guidance application as one example of a robotic 3D vision system in accordance with an embodiment of the present invention.

Referring to the drawings, and in particular FIGS. 1 and 2, some aspects of a nonlimiting example of a block diagram for a robotic system 10 in accordance with an embodiment of the present invention are schematically illustrated. Robotic system 10 includes a 3D image sensor system 11, a robot 12, and a control system 13. Robotic system 10 is configured to perform work, e.g., manufacturing work on a workpiece 14, e.g., a product of manufacture, disposed within or on a robot workspace 15 using a tool 16. In the illustration of FIG. 2, workpiece 14 is disposed upon a workable 17, which is disposed, at least in part, in workspace 15. In some embodiments, robotic system 10 is also or alternatively configured to perform work on workpiece 14 by handling workpiece 14, and in some embodiments by moving workpiece 14 from one location and/or orientation to another location and/or orientation.

Vision sensor 11 is a robotic vision sensor positioned so as to view workspace 15 and workpiece 14. Vision sensor 11 is configured to generate and provide an image of workspace 15 and of the workpiece 14 upon which robot 12 will perform work. Vision sensor 11 is a 3D vision sensor, i.e., capable of acquiring 3D images. In one form, vision sensor 11 is single image sensor in the form of a 3D camera. In other embodiments, vision sensor 11 may take other forms, and may be, for example, a single image sensor or a plurality of image sensors of one or more types, collocated or distributed across desired locations, such as passive and/or active image sensors, which may employ one or more of various technologies to render a 3D image. The technologies may include, for example, single or multiple cameras that employ motion stereo, shape from shading, structured lighting and/or projected texture technology, amongst other technologies. In one form, vision sensor 11 is located on robot 12. In a particular form, vision sensor 11 is located on a moving (dynamic) portion of robot 12. In other embodiments, vision sensor 11 may be located on a static portion of robot 12, a moving (dynamic) portion of robot 12, or may be located elsewhere, static or dynamic. In a distributed form, component sensors of vision sensor 11 may be disposed on static and/or dynamic portions of robot 12 or any other suitable structure at desired locations.

In one form, robot 12 is a multi/axis machine. In other embodiments, robot 12 may be a single axis machine. Robot 12 includes an end effector 18 coupled to an arm 19 via a wrist 20. End effector 18, arm 19 or wrist 20 are nonlimiting examples of robot 12 features onto which vision sensor 11 may be mounted. In one form, tool 16 is mounted to end effector 18. Robot 12 is operative to position tool 16 at desired locations within a reach volume of robot 12, i.e., within workspace 15, in order to perform work on workpiece 14.

In one form, control system 13 includes a controller 21 and a controller 22. In one form, controller 21 and controller 22 are discrete processing units. In other embodiments, control system 13 may reflect a single controller or may reflect any number of controllers. Controller 21 is communicatively coupled to vision sensor 11 and controller 22. In one form, controller 21 is a computation device, e.g., an image processor. In other embodiments, controller 21 may take other forms. In one form, controller 21 is configured to, among other things, execute program instructions to process image data received from vision sensor 11, and to provide processed image data to controller 22. In some embodiments, controller 21 may be configured, alone or in conjunction with controller 22, to transform image data, e.g., 3D image depth data and other image data, from one coordinate system to another, for example, from a vision sensor 11 coordinate system to a robot 12 coordinate system. Controller 21 may also be configured to execute program instructions to perform other tasks associated with operating robot 12.

Controller 22 is communicatively coupled to robot 12 and to controller 21. In one form, controller 22 is a robot controller. In other forms, controller 22 may take other forms. In one form, controller 22 is configured to, among other things, execute program instructions to control the operation and positioning of robot 22 based on based on the 3D image data. In some embodiments, controller 22 may be configured, alone or in conjunction with controller 21, to transform image data, e.g., 3D image depth date and other image data, from one coordinate system to another, for example, from a vision sensor 11 to a robot 12 coordinate system. In some embodiments, controller 21 may also be configured to execute program inspections to perform other image-related tasks.

Figure 4:
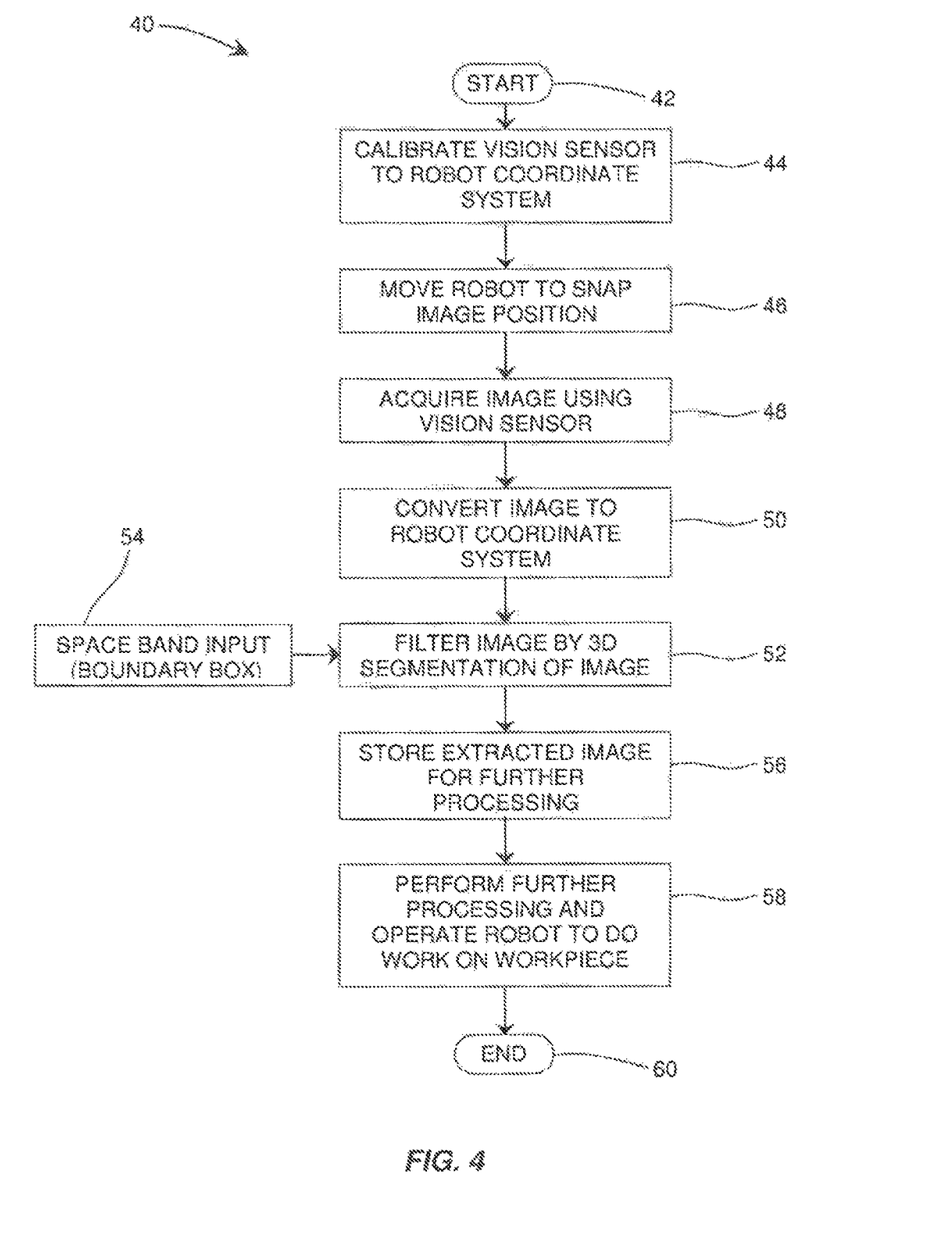
FIG. 4 is a flowchart illustrating some aspects of a nonlimiting example of a method for operating a robot in accordance with an embodiment of the present invention.
Figure 5:
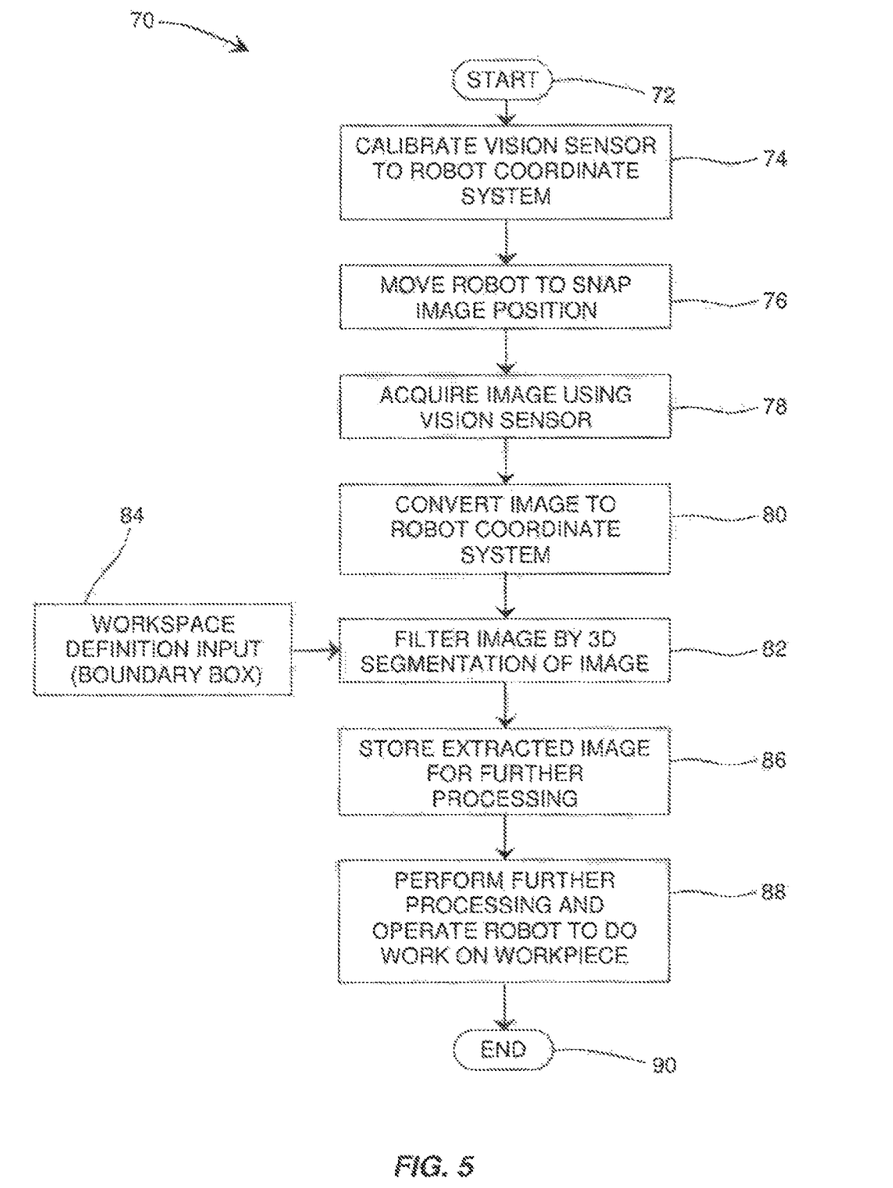
FIG. 5 is a flowchart illustrating some aspects of a nonlimiting example of a method for operating a robot in accordance with an embodiment of the present invention.

Control system 13 configured to execute program instructions to perform various functions set forth herein, e.g., such as those illustrated in and described with respect to FIGS. 4 and 5. It will be understood that the performance of various functions may be executed by controllers 21 and 22 individually and/or jointly, depending upon the particular configurations of controllers 21 and 22 and upon the particular function performed. For example and without limitation, image acquisition may typically performed by controller 21, whereas motion control of robot 12 may typically be performed by controller 22.

In one form, controllers 21 and 22 are microprocessor based and the program instructions are in the form of software stored in one or more memories (not shown). However, it is alternatively contemplated that either or both of controllers 21 and 22 and the program instructions executed thereby may be in the form of any combination of software, firmware and hardware, including state machines, and may reflect the output of discreet devices and/or integrated circuits, which may be co-located at a particular location or distributed across more than one location, including any digital and/or analog devices configured to achieve the same or similar results as a processor-based controller executing software or firmware based instructions. In some embodiments, controller 21 may be packaged together with or housed with vision sensor 21. In other embodiments, controller 21 may be located elsewhere, e.g., in the same cabinet as controller 22.

In one form, vision sensor 11 and controller 21 form a 3D vision system 23. In some embodiments, 3D vision system 23 may also be considered to include controller 22. 3D vision systems such as 3D vision system 23 may be used in robotic applications for various purposes. In one form, 3D vision system 23 is employed for robot guidance. In other embodiments, 3D vision system 23 may additionally or alternatively be employed for, for example and without limitation, inspection, monitoring, safety or for other purposes not mentioned herein. In one form, 3D vision system 23 is configured to capture an image, e.g., a 3D image of workpiece 14 and workspace 15, using vision sensor 11. 3D vision system 23 is also configured to analyze the image and determine workpiece 14 location and geometry. e.g., using control system 13, in particular, controller 21. The workpiece 14 location and geometry are used by control system 13 calculate the path of robot 12 for performing work on the current workpiece 14. Before the workpiece 14 location and geometry is calculated, the 3D image is filtered using a 3D segmentation process, e.g., as described herein, e.g., in order to reduce the size of the 3D image data set.

Figure 3A:
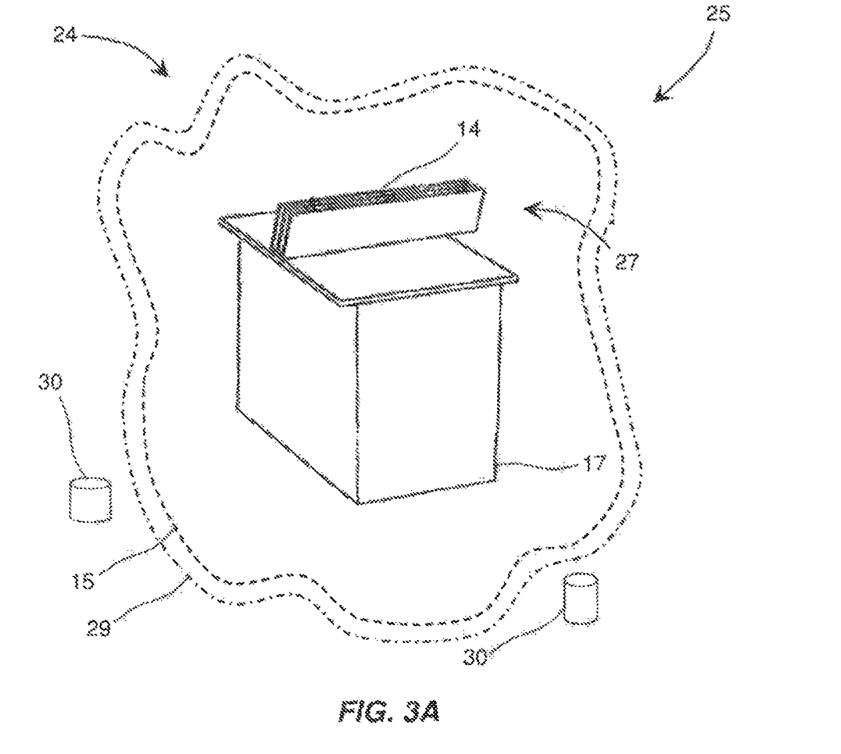
FIG. 3A illustrates some aspects of a nonlimiting example of an image of a workpiece and surrounding geometry acquired by a vision sensor in accordance with an embodiment of the present invention.

Referring to FIG. 3A, some aspects of a nonlimiting example of an image 24 acquired by vision sensor 11 in accordance with an embodiment of the present invention are depicted. Image 24 is an image of a robot scene 25. A robot scene is a scene that encompasses all or a portion of a robot workspace, e.g., workspace 15, and a workpiece disposed within workspace 15 that is to be worked on by a robot, e.g., workpiece 14. In some situations, other objects may be located within workspace 15. In some situations, the robot scene also includes background objects and/or spaces or structures or features outside the workspace. The robot scene 25 depicted in image 24 includes workpiece 14 (that is to have work performed on it by robot 12) and surrounding structures, spaces and/or features, such as workspace 15 and worktable 17 on which workpiece 14 is disposed, and may also include any other surrounding image data captured by vision sensor 11.

Applying the method described below to image 24, the portion of the image of robot scene that is the region of interest is segmented from the area or volume that is outside the region of interest. The latter area or volume are eliminated from image 24, to yield, in one form, an image portion that contains substantially only the region of interest. i.e., contains only the region of interest within some tolerance band. In other embodiments, the image portion contains only the region of interest. Image data pertaining to that image portion, i.e., associated with the region of interest, is stored for subsequent use by robot 12 in performing work on workpiece 14. The region of interest in this example is workpiece 14 and a desired band of space immediately adjacent to and at least partially surrounding workpiece 14, e.g., a workpiece or part displacement range, also called a part movement range or a part motion range, illustrated schematically in FIG. 3B as space band 26. Workpiece 14 and space band 26 thus form a region of interest 27 in the present example. In other embodiments, the region of interest may take other forms.

Figure 3B:
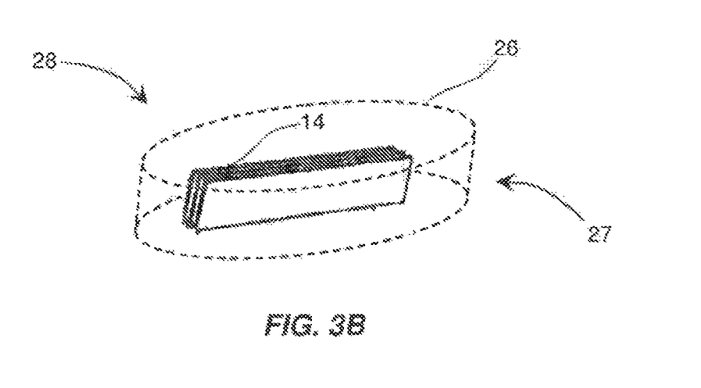
FIG. 3B illustrates some aspects of a nonlimiting example of an image portion obtained from a 3D image segmenting process performed on the image of FIG. 3A in accordance with an embodiment of the present invention.

The size and shape of band 26 may vary with the needs of the application. Space band 26 extends from an inner portion or inner limit immediately adjacent to workpiece 14 to an outer portion or outer limit extending radially outward from workpiece 14. In some situations, the space band may extend into or partially into a workpiece, for example and without limitation, depending upon the geometry of the workpiece and the operations to be performed by robot 12. In various embodiments, the radial offset defining the outer limit of space band 26 may vary along the periphery of workpiece 14 with the needs of the application. Thus, the thickness of space band 26 in any given direction may vary along the periphery of workpiece 14. Although space band 26 is described in the present example as a workpiece displacement range, in other cases, space band 26 may also or alternatively be selected and sized for other purposes, e.g., to reflect a tool 16 envelope, a safety zone, or any other area or volume desired to be observed by vision system 13 and analyzed for change, e.g., as described below.

In this example, the geometry from the robot scene outside workpiece 14 and band 26 that is also visible in the original unsegmented image, e.g., image 24, is not in the region of interest. Using methodology described herein, the image is segmented, and the region of interest is extracted from the surrounding areas or the balance of image 24. The results of this segmenting and filtering of the FIG. 3A image is shown in FIG. 3B. The area surrounding the region of interest is removed, e.g., eliminated from the original image (or, alternatively, the region of interest is extracted from the original image). For example, in this example, the region of interest did not include workspace 15 or worktable 17, and hence, workspace 15 (to the extent it is outside of workpiece 14 and space band 26) and worktable 17 are not included in the segmented and filtered image portion 28 illustrated in FIG. 3B. In the example of FIGS. 3A and 38, the region of interest 27 is workpiece 14 and the area immediately around it. i.e., band 26, e.g., the workpiece displacement or movement range. Hence the image portion 28 extracted from image 24 and illustrated in FIG. 3B, includes substantially only the region of interest 27, i.e., workpiece 14 and band 26.

In some embodiments, the region of interest may be workspace 15, which is all of the area or volume defined by all points that robot 12 can reach, which may or may not include all points reachable by all or one or more portions of tool 16, depending on the embodiment. In some embodiments, the envelope of tool 18 may be accounted for, at least in part, by a space band, which in various embodiments may be disposed about workspace 15, within workspace 15, or disposed partially about and partially within workspace 15. In other embodiments, the region of interest may be the workspace plus a space band disposed about the workspace, e.g., generally represented with reference character 29. Space band 29 represents, in various embodiments, a tool 16 envelope or another desired band of space added to workspace envelope 15, e.g., a safety zone, or any other area or volume desired to be observed by vision system 13 and analyzed for change, e.g., as described below. In still other embodiments, the region of interest may take other forms. In either case, other objects or background image data, e.g., generically represented by cylinders 30, that are disposed within robot scene 25 but outside of workspace 15 or space band 29, depending upon the embodiment, is not within the region of interest, and hence, will not be included in the final image obtained via the segmenting and filtering process described herein.

For embodiments employing a space band 29 around workspace 15, the size and shape of band 29 may vary with the needs of the application. In one form, space band 29 extends from an inner portion or inner limit immediately adjacent to outer surfaces workspace 15 to an outer portion or outer limit extending radially outward from workspace 15. In various embodiments, space band 29 the radial offset of the outer limit of space band 29 may vary along the periphery of workspace 15 with the needs of the application. Thus, the thickness of space band 29 in any given direction may vary along the periphery of workspace 15. Although space band 29 is described in the present example as a tool 16 envelope, in other cases, space band 29 may also or alternatively be selected and sized for other purposes, e.g., any area or volume externally adjacent to workspace 15 and desired to be observed by vision system 13 and analyzed for change, e.g., as described below. The actual shape of band space 29 varies with each application. In some situations, the space band may extend into or partially into a workspace.

In any case, the image is filtered by segmenting the image into a portion containing the region of interest and a portion containing all of the image data outside of the region of interest; and by extracting or retaining the image data for the portion of the image that pertains to the region of interest, thereby eliminating the image data pertaining to portion of the image that is outside of the region of interest. Control system 13 is operative to control the movement and operation of robot 21 to perform work on workpiece 14 based on the segmented and filtered image data pertaining to the region of interest.

Referring to FIGS. 4 and 5, there are shown flowcharts 40 and 70 that depict some aspects of nonlimiting examples of methods for operating a robot in accordance with some embodiments of the present invention. In some embodiments, the method includes transforming the 3D image data, e.g., including depth data of the 3D images, to the robot coordinate system, e.g., a robot based coordinate system, which allows known information from the robot 12 (e.g., the workspace, singular points, workpiece location in robot coordinates) to be employed, e.g., in filtering the 3D image data to obtain the segmented and filtered image data associated with the 3D region of interest.

In FIGS. 4 and 5 the steps to perform the method are presented as a flowchart 40 and 70 respectively for two cases. In the first case shown in flowchart 40 of FIG. 4, the workpiece or part displacement or movement range is used to filter the data. In the second case shown in flowchart 70 of FIG. 5, the image data is filtered based on robot workspace criteria, such as the envelope of the robot workspace 15 which defines the reach of the robot with or without the tool. A space band or band threshold can be added to the robot workspace so that the filtered data includes an extra data band or space band around the robot workspace that can be useful to the robot.

Depending on the application, one or both cases may be applied at the same time. The space band threshold may be applied to both cases. In the first case (FIG. 4) the extra band of space is useful to allow the robot to see if the extra area surrounding the workpiece can be analyzed for changes, e.g., deflection of workpiece 14, damage to workpiece 14, the presence of other objects adjacent to workpiece 14 or the presence of a human or a portion of a human immediately adjacent to workpiece 14. In both cases the extra band can be useful as an early warning system in regard to the robot workspace, so that the robot can be "aware" of events or objects or persons further away from workpiece 14.

In the flowchart of FIG. 4, the process starts at block 42. At block 44, vision sensor 11 is calibrated to the robot 12 coordinate system, e.g., so that 3D image data can be transformed to a common coordinate system. The calibration data is then stored in a memory accessible by control system 13. The calibration may be performed only once, and the calibration parameters stored for subsequent image filtering. Thus, whereas an initial use of the process of FIG. 4 includes calibration of vision sensor 11 to the robot 12 coordinate system, subsequent passes through the process of flowchart 40 may use the calibration data previously stored during the initial pass.

At block 46 of flowchart 40, the robot is moved to the snap image position. That is, robot 12 is moved to place vision sensor 11 at a desired position for acquiring an image of the robot scene, e.g., robot scene 25. Block 46 is applicable to applications where vision sensor 11 is mounted on a moving part of robot 12. In applications where vision sensor 11 is mounted on a stationary part of robot 12 or another stationary location, block 42 is not performed, or may be performed as part of set up during training of robot 12.

At block 48, a 3D image is acquired by vision sensor 11. In one form, the image data is obtained based on controller 21 receiving the output of vision sensor 11. In other embodiments, the image may be obtained based on controller 22 receiving the output of vision sensor 11, e.g., where controller 22 has sufficient storage and processing capability to acquire the image.

At block 50, the 3D image is converted to the robot coordinate system. Alternatively, in some embodiments, the 3D image may be retained in or converted to a vision sensor 11 coordinate system at block 50.

At block 52, the converted robot scene image data is filtered by 3D segmentation of the image into a first image portion containing substantially only a region of interest within the robot scene, and a second image portion containing the balance of the robot scene outside the region of interest; and by obtaining or retaining from the robot scene image the image data that is associated with the first image portion. In the embodiment of FIG. 4, this segmenting and filtering of the image uses the input from the space band input block 54, which in the nonlimiting example of FIG. 4 is a workpiece or part displacement or movement range input. This input relates to accommodating variability in the location of workpiece or part 14, e.g., due to deflection of workpiece 14 by tool 16 during work being performed on workpiece 14 by robot 12, due to variation in placement of workpiece 14 upon work table 17, and/or displacement for other reasons, including reasons not mentioned herein. The region of interest in the example of flowchart 40 is thus the workpiece and the volume immediately adjacent to workpiece 40, which is a space band, e.g., space band 26, in the form of workpiece displacement range. The filtering of the image may be performed in one or more different fashions, for example, by comparing the robot scene image with the image data of the region of interest, workpiece 14 plus space band 26, to illustrate those features or objects that are outside of the region of interest, e.g., subtracting or eliminating from the robot scene image all of the image data that is outward of the region of interest, or extracting from the robot scene image all of the image data that is within the region of interest. In some embodiments, vision system 23 may recognize workpiece 14, e.g., via pattern matching with known images of workpiece 14 in different orientations. Once recognized, the image data associated with workpiece 14 in the robot scene image data may be determined, along with image data pertaining to the surrounding area defined based on space band input block (boundary box) 56, e.g., space band 26, thus obtaining image data that contains substantially only the region of interest. In various embodiments, various algorithms may be employed to segment and filter the robot scene image data.

At block 56, image data associated with image portion containing substantially only the region of interest in the segmented and filtered robot scene image is stored, e.g., in control system 13, in particular, controller 21. The image data is stored, for example, for subsequent further processing, such as object recognition, collision detection, motion planning, etc. In various embodiments, the image data may also or alternatively be stored in whole or in part in controller 22. The extracted image portion may be provided to controller 22 by controller 21 or to other devices for processing. In some embodiments, the extracted image portion may optionally be converted to the vision sensor 11 coordinate system, which in some embodiments may make it easier to analyze the data. An example is the occupancy space in front of the robot 12. Defining the 3D image in the camera coordinate system makes it relatively easy to determine the closest section to the camera 11 because the closest objects in the image are closer (smaller depth) to the camera.

At block 58, further processing is performed, and the image data that is associated with substantially only the region of interest used by control system 13 to control the movement of robot 12 and perform work on workpiece 14. In various embodiments, the further processing may be the same as or similar to processing that is performed with robotic systems that do not employ the segmenting and filtering system and methodology associated with same aspects of the present invention, and hence the further processing is not described herein. Block 58 may be executed at any time, whether immediately after completion of block 56 or any time subsequently.

At block 60, the process ends.

Referring to FIG. 5, there is illustrated a flowchart 70 depicting some aspects of a nonlimiting example of a method for operating a robot, wherein the acquired 3D image data is segmented based on the robot workspace criteria. The method starts at block 72. Blocks 74, 76, 78 and 80 are the same in function as blocks 44, 46, 48 and 50 of flowchart 40 in FIG. 4, and hence the respective descriptions set forth above with respect to respective blocks 44, 46, 48 and 50 are likewise applicable, and are not repeated here.

At block 82, the converted image data is filtered by 3D segmentation of the image into a first image portion containing substantially only a region of interest within the robot scene, and a second image portion containing the balance of the robot scene outside the region of interest; and by obtaining or retaining from the robot scene image the image data that is associated with the first image portion. In the embodiment of FIG. 5, this segmenting and filtering of the image uses the input from the workspace definition input block 84, which in the nonlimiting example of FIG. 4 is a definition of workspace 15 as a surface, e.g., a 3D CAD rendered or determined surface, or any 3D surface type that defines the geometry of workspace 15, or as an analytical equation that defines the geometry of workspace 15. In other embodiments, other definitions of workspace 15 may be employed. The region of interest in the example of flowchart 70 is thus the robot workspace, e.g., workspace 15. In some embodiments, a space band may also be inputted, e.g., at block 84, defining a volume of space immediately adjacent to and extending from the boundary of workspace 15, e.g., space band 29. The filtering of the image may be performed in one or more different fashions, for example, by comparing the robot scene image with the image representation of the workspace (or the workspace plus space band, depending upon the embodiment) to illustrate those features or objects that are outside of the workspace (or workspace plus space band, depending upon the embodiment), e.g., subtracting from the robot scene image all of the image data that is outward of the workspace (or the workspace plus space band, depending upon the embodiment), or extracting from the robot scene image all of the image data that is within the workspace (or the workspace plus space band, depending upon the embodiment).

At block 86, the image data associated with the image portion containing substantially only the region of interest is stored, e.g., in control system 13, in particular, controller 21, for further processing, e.g., as described above with respect to block 56 of FIG. 4.

At block 88, further processing is performed, and the image data that is associated with substantially only the region of interest is used by control system 13 to control the movement of robot 12 and perform work on workpiece 14, e.g., as described above with respect to block 58 of FIG. 4.

At block 90, the process of FIG. 5 ends.

Embodiments of the present invention include a robotic system, comprising: a robot having an associated workspace; a vision sensor constructed to obtain a 3D image of a robot scene including a workpiece located in the workspace; and a control system communicatively coupled to the vision sensor and to the robot, wherein the control system is configured to execute program instructions to filter the image by segmenting the image into a first image portion containing substantially only a region of interest within the robot scene, and a second image portion containing the balance of the robot scene outside the region of interest; and by storing image data associated with the first image portion, wherein the control system is operative to control movement of the robot to perform work on the workpiece based on the image data associated with the first image portion.

In a refinement, the control system is configured to execute program instructions to calibrate the vision sensor to a robot coordinate system.

In another refinement, the image of the robot scene includes robot scene image data; and the control system is configured execute program instructions to transform the robot scene image data to a robot coordinate system.

In yet another refinement, the control system is configured to execute the program instructions to segment the image after transforming the robot scene image data to the robot coordinate system.

In still another refinement, the region of interest is the workpiece; and the first image portion includes substantially only the workpiece and the workpiece displacement range.

In yet still another refinement, the region of interest is the workpiece; and the first image portion includes substantially only the workpiece.

In a further refinement, the control system is configured to execute program instructions to create a space band around the workpiece; the region of interest is the workpiece and the space band; the first image portion includes substantially only the workspace and the space band.

In a yet further refinement, the region of interest is the workspace; and the first image portion includes substantially only the workspace.

In a still further refinement, the control system is configured to execute program instructions to create a space band around the workspace; the region of interest is the work piece, the workspace and the space band; and the first image portion includes substantially only the work piece, the workspace and the space band.

In a yet still further refinement, the vision sensor is mounted an a moving portion of the robot.

Embodiments of the present invention include a method for operating a robot, comprising: acquiring a 3D image of a robot scene using a robotic vision sensor; performing 3D segmenting the image into a first image portion containing substantially only a region of interest within the robot scene, and a second image portion containing the balance of the robot scene outside the region of interest; storing image data associated with the first image portion; and operating a robot to perform work on a workpiece using the stored image data associated with the first image portion.

In a refinement, the 3D image includes robot scene image data, the method further comprising transforming the robot scene image data from a robotic vision sensor coordinate system to a robot coordinate system.

In another refinement, the segmenting is performed after the transforming.

In yet another refinement, the method further comprises defining a space band disposed about the workpiece, wherein the region of interest includes only the workpiece and the space band.

In still another refinement, the space band is defined as a workpiece displacement range.

In yet still another refinement, the method further comprises defining a space band disposed about the workspace, wherein the region of interest includes the work piece, the workspace and the space band.

In a further refinement, the space band is defined by a robot tool envelope.

Embodiments of the present invention include a method for operating a robot, comprising: calibrating a robotic vision sensor to a robot coordinate system; acquiring a 3D image of a robot scene using the robotic vision sensor; filtering the 3D image to yield an image portion containing substantially only a region of interest within the robot scene; and operating a robot to perform work on a workpiece in the region of interest using the first image portion.

In a refinement, the method further comprises segmenting the image into a first image portion containing substantially only the region of interest within the robot scene, and a second image portion containing the balance of the robot scene outside the region of interest; and storing image data associated with the first image portion.

In another refinement, the 3D Image includes robot scene image data, the method further comprising transforming the robot scene image data from a robotic vision sensor coordinate system to a robot coordinate system.

Figure 6:
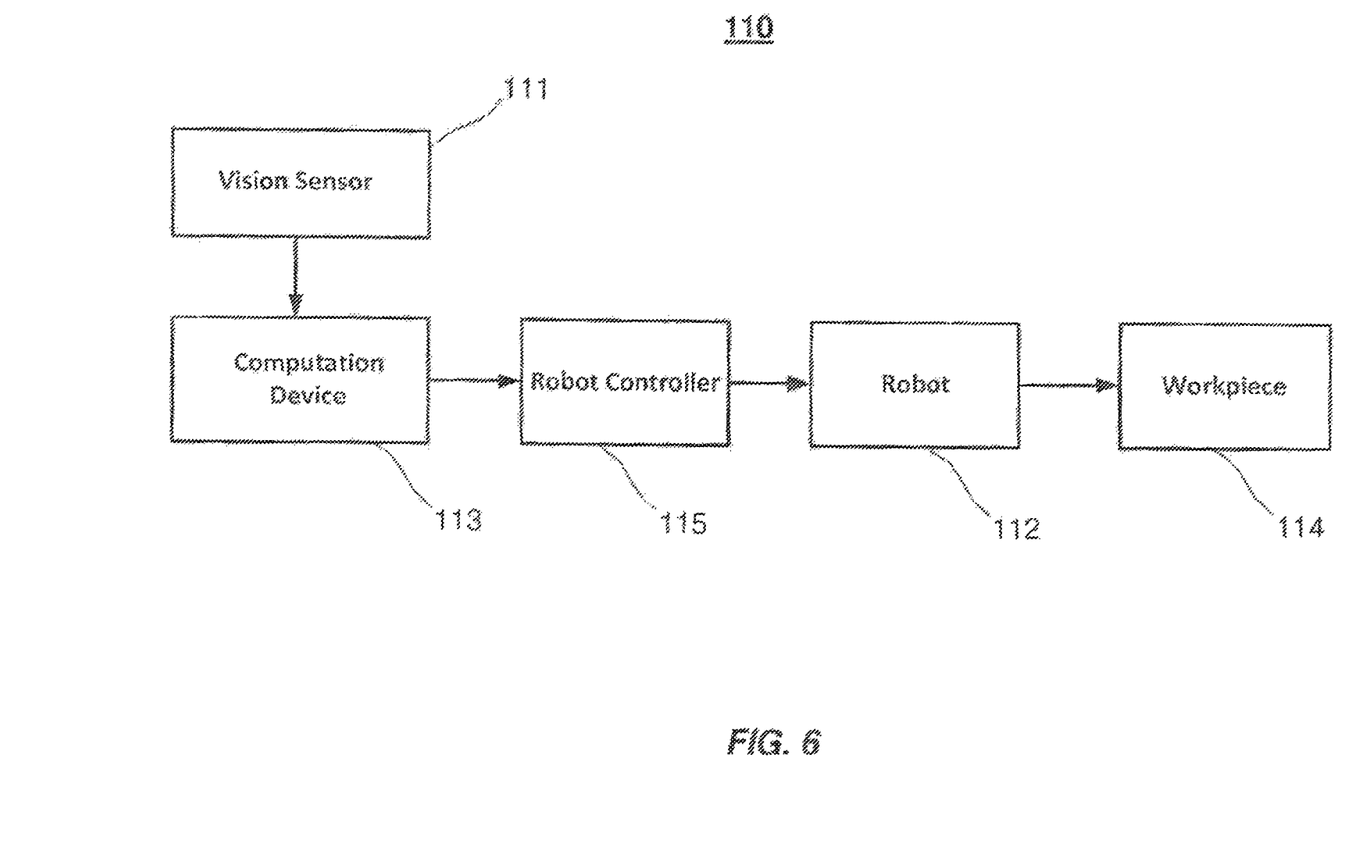
FIG. 6 shows a robotic system that has a robot and 3D vision sensor that provides an image of the workpiece on which the robot will perform work.

Referring now to FIG. 6, there is shown a block diagram for a robotic system 110 that has a robot 112 and a 3D vision sensor 111 that provides an image of the workpiece 114 on which robot 112 will perform work. The image from the vision sensor 111 is provided to a computation device 113 that is connected to a robot controller 115 that has stored in it the instructions to be followed by the robot 112 when it performs work on the workpiece 114. It should be appreciated that FIG. 6 shows one example for system 110 since for example and without limitation the 3D vision sensor 111, that is a camera, could be together with computation device 113 or the computation device 113 and the robot controller 115 can be together in the same cabinet.

Figure 7:
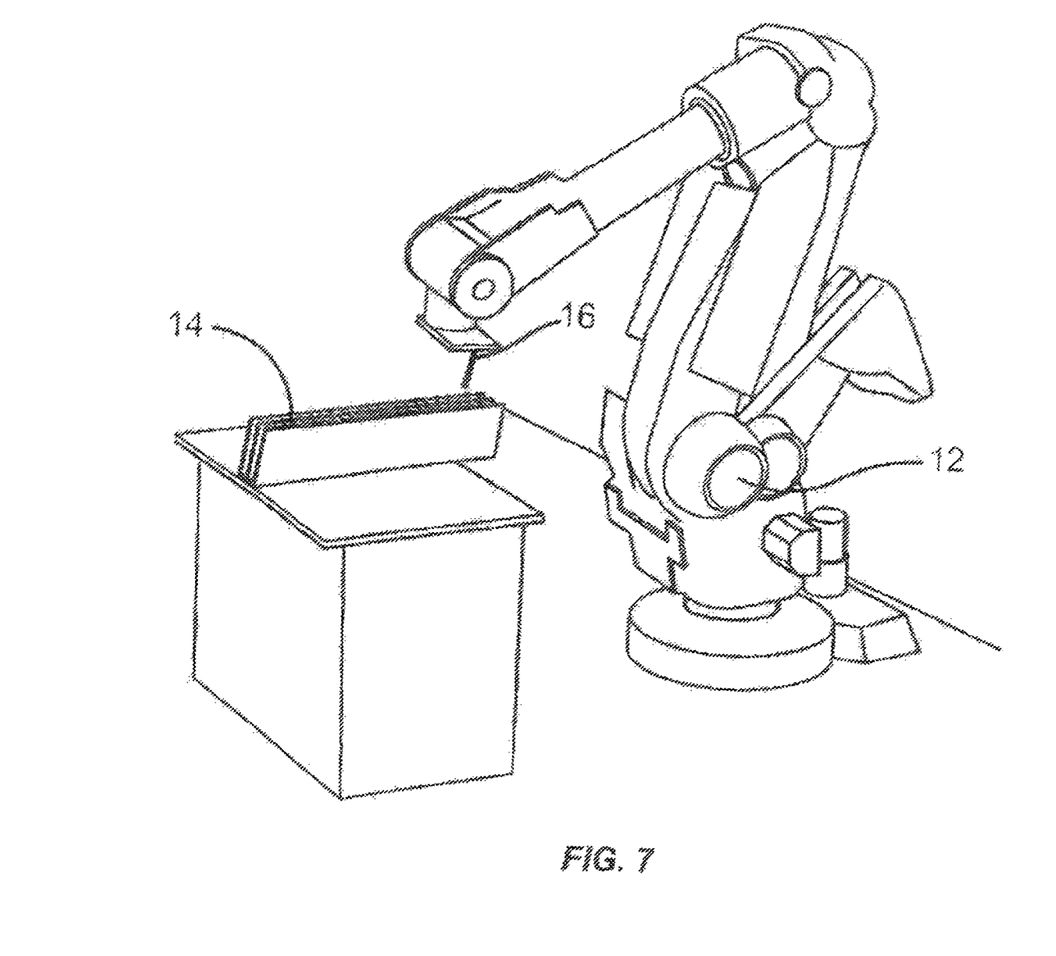
FIG. 7 shows a vision guidance application as one example of a robotic 3D vision system.

A 3D vision system can be used in many different robotic applications for guidance, inspection, monitoring, or safety. FIG. 7 shows as one example for the use of a 3D vision system a typical vision guidance application. The application includes the robot 112, shown for ease of illustration only with a tool 116 attached to its end effector, and the 3D vision sensor 111 (not shown in FIG. 7 for ease of illustration) which can be a camera mounted on the robot 112, a workpiece or object or part of interest which in this example is shown in FIG. 7 as a part 114 with fins sitting on a table.

The 3D vision task is to capture an image, analyze the image and determine part location and geometry. The part location and geometry is used to calculate the robot path for the current part. Before the part location and geometry is calculated, the 3D segmentation described below is used to reduce the 3D data set. While the camera 111 can be mounted on robot 112 it should he appreciated that the camera 111 can be mounted elsewhere but no matter where the camera 111 is mounted it preferable that it be calibrated to robot 112.

Figure 8A:
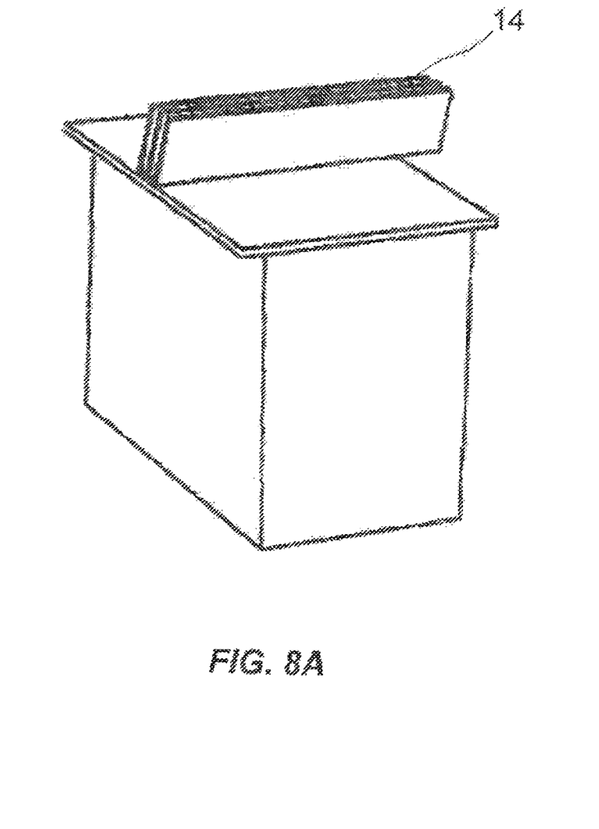
FIG. 8A shows an image acquired by the 3D vision sensor of a part to have work performed on it by a robot and the surrounding geometry.

FIG. 8A shows an image acquired by the 3D vision sensor 111 of part 114 that is to have work performed on it by robot 112 and the surrounding geometry such as the table shown in FIG. 7 on which part 114 is sitting and also shown in this figure. The area of interest for this use of 3D vision is the area around part 114. However, the other geometry from the robot scene that is also visible in the image shown in FIG. 8A is not necessary for the robot 112 and 3D vision processing so that the robot can perform work on part 114.

Figure 8B:
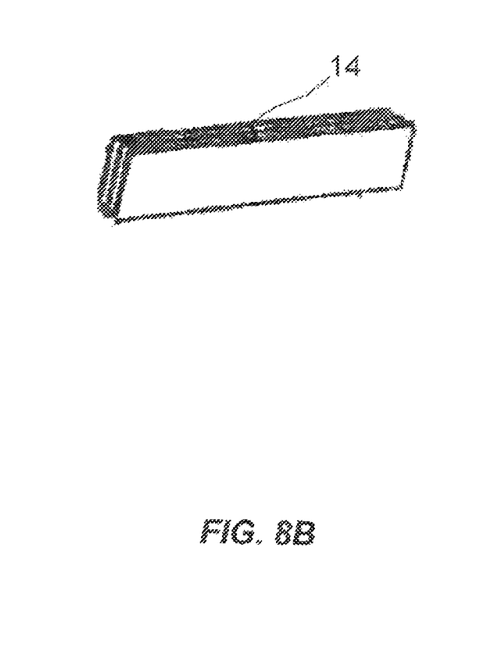
FIG. 8B shows the results of segmenting the image shown in FIG. 8A.

Applying the method described below to the image shown in FIG. 8A, the part of the robot scene that is of interest, here part 114, can be extracted from the image in FIG. 8A with the surrounding areas of the part 114 or the area that the robot 112 can reach and all of the other data from the FIG. 8A image, such as the other geometry, can be eliminated. The results of this segmenting of the FIG. 8A image is shown in FIG. 8B.

Figure 9:
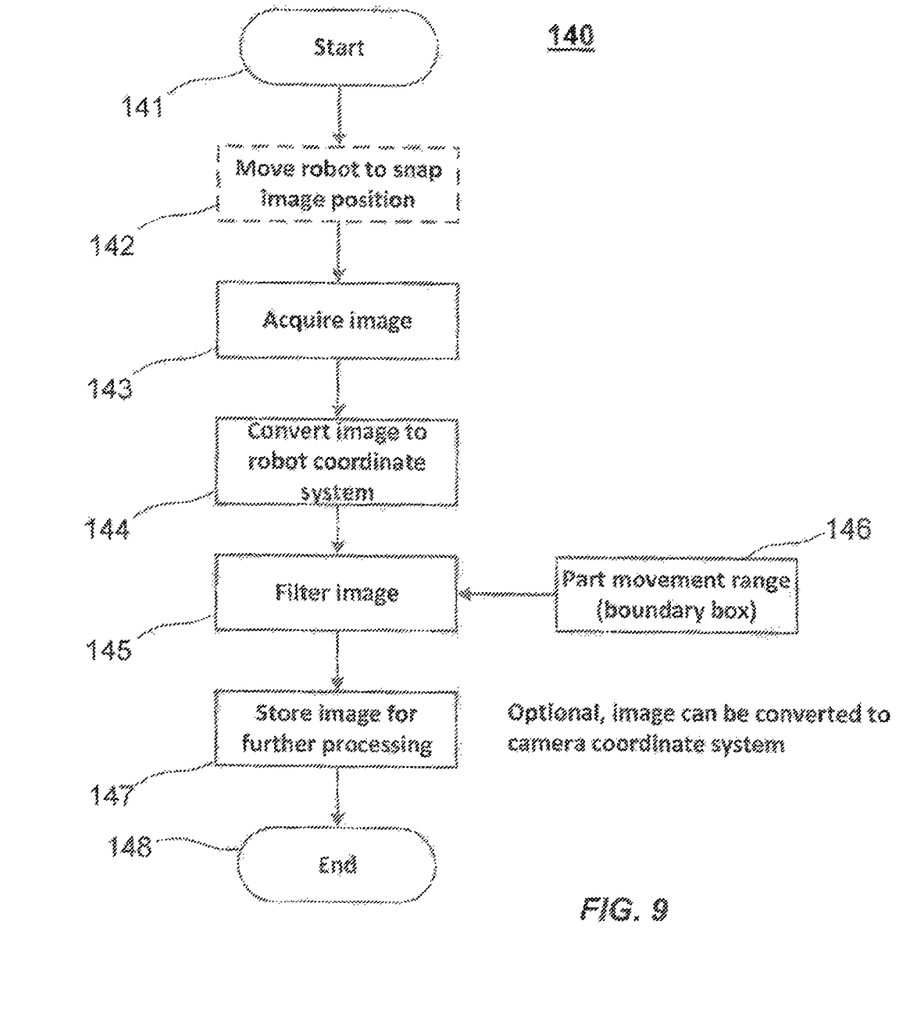
FIG. 9 shows a flowchart for segmenting the image using the part movement range to filter the data.
Figure 10:
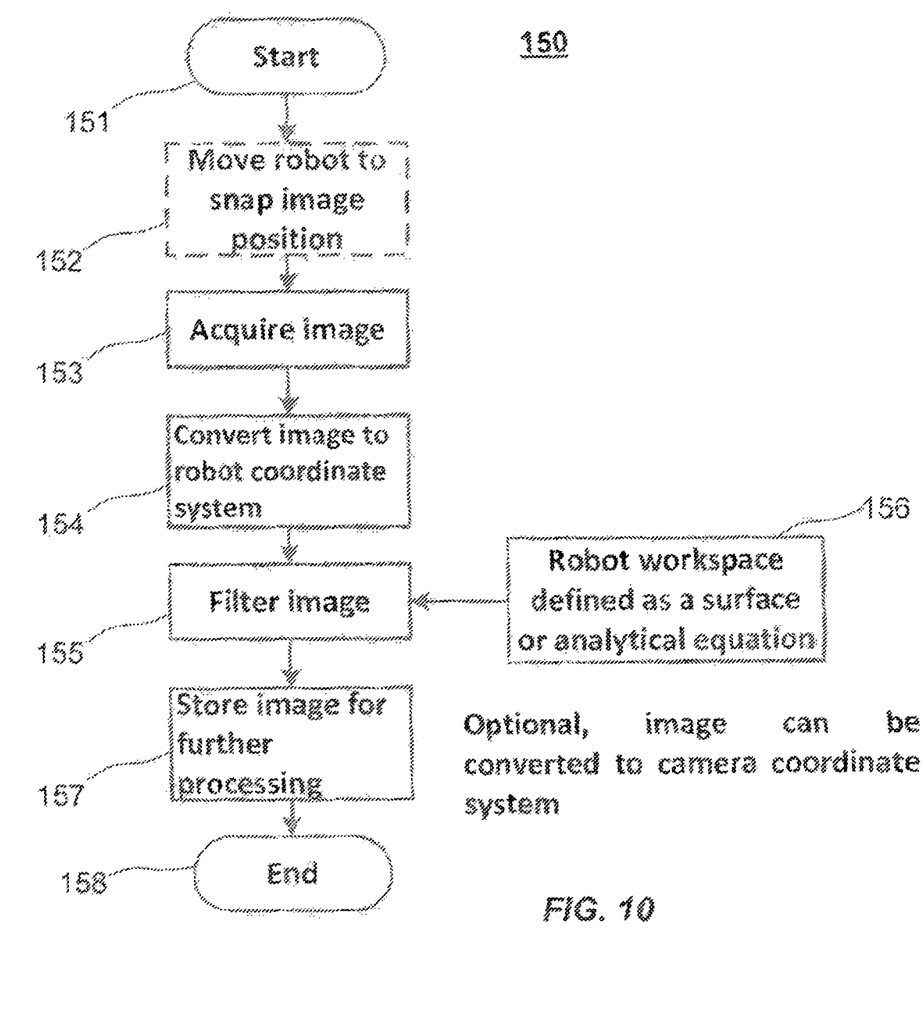
FIG. 10 shows a flowchart for segmenting the image by filtering the data based on robot workspace criteria such as the envelope of the robot workspace which defines the reach of the robot with or without the tool.

Referring now to FIGS. 9 and 10, there are shown flowcharts 140 and 150 respectively for the method described in detail below of segmenting the data to arrive at the segmented image of the robot scene. The method consists in transforming the depth data of the 3D images to one of the robot coordinate system. This way the known information from the robot 112, e.g., the workspace, singular points, part location in robot coordinates, can be used to filter the 3D data resulting in the 3D area of interest for further processing.

In FIGS. 9 and 10 the steps to perform the method are presented as a flowchart 140 and 150 respectively for two cases. In the first case shown in flowchart 140 of FIG. 9, the part movement range is used to filter the data. In the second case shown in flowchart 150 of FIG. 10 the data is filtered based on robot workspace criteria such as the envelope of the robot workspace which defines the reach of the robot with or without the tool and a band threshold can be added to the robot workspace so that the filtered data includes an extra data band around the robot workspace that can be useful to the robot.

Depending on the application, one or both cases can be applied at the same time. The band threshold is applied in both cases. In the first case the extra band is useful to see if the extra structure surrounding a part of interest can be analyzed for changes. In both cases the extra band can be useful as an early warning system in regard to the robot workspace so that the robot can be aware of events that are further away.

In the flowchart of FIG. 9, the process starts at step 141. At step 142 of flowchart 140, the robot is moved to snap the image position, that is, the robot is moved to the position where the sensor, for example camera 111, needs to be placed to acquire an image. Step 142 is employed, for example, if the 3D sensor, for example camera 111, is mounted on the robot and is not needed for static mounted 3D sensors. This step is employed for a camera 111 mounted on the robot because it is desirable that the robot mounted camera 111 see the part location, since the camera location can change; whereas a static mounted camera cannot change its location, and can be set up during training of the robot 112.

At step 143, the new 3D image is acquired from the 3D sensor 111. Notwithstanding what is shown in FIG. 6, the image may be acquired by the robot controller 115 if the controller has sufficient storage and processing power to acquire the image. At step 144, the new 3D image is converted to the robot coordinate system or the robot workspace can be converted to the camera coordinate system and the image is then filtered. The camera 111 is preferably calibrated to robot 112. By applying the camera to robot transformation and current robot position to the 3D image, the new 3D image is converted to the robot coordinate system. As can be appreciated, if the segmentation range is provided to the camera 111, then this step is not needed.

At step 145, the new 3D image converted to the robot coordinate system is filtered to segment the image to remove as shown in FIGS. 8A and 8B the other geometry captured in the image. This filtering of the image uses the input from the part movement range block 146. This input is needed as there can be variability in the location of part 114. The filtering of the image may be a simple comparison, for example, is what is shown out of the work space or the robot work space.

At step 147, the segmented image can be stored in the computation device 113 for further processing, for example, object recognition, collision detection, motion planning etc. While the segmented image is stored in the computation device 113 because that device is designated to perform the further processing, the processing device 113 can, provide this data to the robot 112 or other devices for processing. Optionally, the segmented image can be converted to the camera coordinate system which can make it easier to analyze the data. An example is the occupancy space in front of the robot 112. Defining the 3D image in the camera coordinate system makes it relatively easy to determine the closest section to the camera 111 because the closest objects in the image are closer (smaller depth) to the camera.

Referring now to FIG. 10, there is shown the flowchart 50 for the method where the vision data is segmented based on the robot workspace criteria. The method starts at step 151, Steps 153 and 153 are identical in function to steps 142 and 143 of the flowchart 140 shown in FIG. 9.

In step 154, the image is, as happens in step 144, converted to the robot coordinate system or the robot workspace can be converted to the camera coordinate system and the image is then filtered. As can be appreciated, the robot workspace and the 3D image need to be referenced to the same coordinate system so that the 3D image outside of the robot workspace can be marked/flagged or eliminated. As also can be appreciated, if the segmentation range is provided to the camera 111, then this step is not needed.

In step 155, the image is filtered in the robot coordinate system using input from block 156 of the robot workspace defined as a surface or as an analytical equation, because the robot workspace is provided as a surface or analytical equation. It should be appreciated that any 3D representation of the robot workspace is valid to use as the input to extract the data outside of that workspace. If however, the image is converted in step 54 to the camera coordinate system, then the filtering should be performed in that system.

As in step 147, the image at step 157 is stored for further processing and can be optionally converted to the camera coordinate system if it is not in that system. The method ends at step 158.

As can be appreciated from the above description, the 3D sensor is preferably be calibrated to the robot coordinate system so that the 3D data can be transformed to a common coordinate system.

As can also be appreciated from the description of the flowcharts shown in FIGS. 9 and 10, the same processing technique applies for the images from static and mounted cameras. When the 3D sensor is robot mounted, then there is an additional step to move the robot to the acquired image position. This position can be the same or different every time and it is based on the logic of the robot applications. If the position is the same, then the process can be sped up by reading only the area of interest from the 3D sensor that is trained once at the beginning of the process. The same procedure applies for a static camera. Otherwise, the area of interest in the sensor is preferably updated every time.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A robotic system, comprising:
a robot having an associated workspace;
a vision sensor constructed to obtain a 3D image of a robot scene including a workpiece located in the workspace; and
a control system communicatively coupled to the vision sensor and to the robot, wherein the control system is configured to execute program instructions to filter the image by segmenting the image into a first image portion containing only a region of interest within the robot scene, and a second image portion containing a remainder of the robot scene which is outside the region of interest, and wherein the control system is further configured to store image data associated with the first image portion,
wherein the control system is operative to control movement of the robot to perform work on the workpiece based on the image data associated with the first image portion;
wherein the vision sensor is constructed to provide robot scene image data from the image of the robot scene, and the control system is configured to execute program instructions to transform the robot scene image data to a robot coordinate system; and
wherein the control system is configured to execute the program instructions to filter the image by segmenting the image after the control system transforms the robot scene image data to the robot coordinate system.

2. The robotic system of claim 1, wherein the control system is configured to execute program instructions to calibrate the vision sensor to a robot coordinate system.

3. The robotic system of claim 1, wherein the region of interest is the workpiece; and wherein the first image portion includes only the workpiece and a workpiece displacement range.

4. The robotic system of claim 1, wherein the region of interest is the workpiece; and wherein the first image portion includes only the workpiece.

5. The robotic system of claim 1, wherein the control system is configured to execute program instructions to create a space band around the workpiece; wherein the region of interest is the workpiece and the space band; and wherein the first image portion includes only the workspace and the space band.

6. The robotic system of claim 5, wherein the region of interest is the workspace; and wherein the first image portion includes substantially only the workspace.

7. The robotic system of claim 1, wherein the control system is configured to execute program instructions to create a space band around the workspace; wherein the region of interest is the work piece, the workspace and the space band; and wherein the first image portion includes only the work piece, the workspace and the space band.

8. The robotic system of claim 1, wherein the vision sensor is mounted on a moving portion of the robot.

9. The robotic system of claim 1, wherein the region of interest is confined to areas accessible by the robot.

10. A method for operating a robot, comprising:
acquiring a 3D image of a robot scene using a robotic vision sensor;
performing 3D segmenting the image into a first image portion containing only a region of interest within the robot scene, and a second image portion containing a remainder of the robot scene which is outside the region of interest;
storing image data associated with the first image portion;
operating a robot to perform work on a workpiece using the stored image data associated with the first image portion;
wherein the 3D image includes robot scene image data, further comprising transforming the robot scene image data from a robotic vision sensor coordinate system to a robot coordinate system; and
wherein the performing 3D segmenting is performed after the transforming.

11. The method of claim 10, further comprising defining a space band disposed about the workpiece, wherein the region of interest includes only the workpiece and the space band.

12. The method of claim 11, wherein the space band is defined as a workpiece displacement range.

13. The method of claim 10, further comprising defining a space band disposed about the workspace, wherein the region of interest includes the work piece, the workspace and the space band.

14. The method of claim 13, wherein the space band is defined by a robot tool envelope.

15. The method of claim 10, wherein the region of interest is confined to areas accessible by the robot.

16. A method for operating a robot, comprising:
calibrating a robotic vision sensor to a robot coordinate system;
acquiring a 3D image of a robot scene using the robotic vision sensor;
filtering the 3D image to yield an image portion containing only a region of interest within the robot scene;
operating a robot to perform work on a workpiece in the region of interest using the first image portion; and
wherein the region of interest is further defined by an area of reach of the robot.

17. The method of claim 16, further comprising segmenting the image into a first image portion containing only the region of interest within the robot scene, and a second image portion containing a remainder of the robot scene which is outside the region of interest; and storing image data associated with the first image portion.

18. The method of claim 16, wherein the 3D image includes robot scene image data, further comprising transforming the robot scene image data from a robotic vision sensor coordinate system to a robot coordinate system.

19. The method of claim 16, wherein the area of reach includes only areas accessible by a tool connected to the robot.

* * * * *